United States Patent
Baek et al.

(10) Patent No.: US 11,050,064 B2
(45) Date of Patent: Jun. 29, 2021

(54) SEAWATER BATTERY CELL AND SEAWATER BATTERY INCLUDING SEAWATER BATTERY CELLS

(71) Applicant: KOREA INSTITUTE OF OCEAN SCIENCE & TECHNOLOGY, Busan (KR)

(72) Inventors: Seung Jae Baek, Yongin-si (KR); Yu Jae Song, Daegu (KR); Soo Mee Kim, Busan (KR); Sung Hoon Lim, Busan (KR); Cheol Su Pak, Busan (KR)

(73) Assignee: Korea Institute of Ocean Science & Technology, Busan (KR)

( * ) Notice: Subject to any disclaimer, the term of this patent is extended or adjusted under 35 U.S.C. 154(b) by 208 days.

(21) Appl. No.: 16/246,313

(22) Filed: Jan. 11, 2019

(65) Prior Publication Data

US 2020/0020955 A1 Jan. 16, 2020

(30) Foreign Application Priority Data

Jul. 16, 2018 (KR) ........................ 10-2018-0082534

(51) Int. Cl.
*H01M 2/06* (2006.01)
*H01M 2/20* (2006.01)
(Continued)

(52) U.S. Cl.
CPC ............... *H01M 6/34* (2013.01); *H01M 4/06* (2013.01); *H01M 6/045* (2013.01); *H01M 2300/0002* (2013.01)

(58) Field of Classification Search
CPC .......... H01M 2/06; H01M 2/202; H01M 2/30; H01M 4/06; H01M 2200/00;
(Continued)

(56) References Cited

U.S. PATENT DOCUMENTS 10,644,328 B1 * 5/2020 Smith ..................... H01M 4/06
2014/0162108 A1 * 6/2014 Visco .................... H01M 4/366
429/131

FOREIGN PATENT DOCUMENTS

JP 6-97817 B2 11/1994
JP 09-129202 * 5/1997
(Continued)

OTHER PUBLICATIONS

English translation of JP Publication 09-129202, May 1997.*
Office Action of corresponding Korean Patent Application No. 10-2018-0082534—9 pages (dated Nov. 29, 2019).

*Primary Examiner* — Brittany L Raymond
(74) *Attorney, Agent, or Firm* — Knobbe Martens Olson & Bear LLP

(57) ABSTRACT

A seawater battery cell may include: a seawater battery module having an anode and a cathode; a watertight structure coupled to the seawater battery module, the watertight structure being configured to tightly seal the anode and the cathode from seawater; a first watertight connector portion electrically connected to any one of the anode and the cathode; and a second watertight connector portion electrically connected to remaining one of the anode and the cathode and coupled to a first watertight connector portion of an adjacent seawater battery cell. As a result, the seawater battery cell, which can be fully submerged under seawater, can be applied to various fields.

14 Claims, 8 Drawing Sheets

(51) Int. Cl.
*H01M 2/30* (2006.01)
*H01M 4/06* (2006.01)
*H01M 6/04* (2006.01)
*H01M 6/34* (2006.01)

(58) Field of Classification Search
CPC ......... H01M 2300/0002; H01M 6/045; H01M 6/34; Y02E 60/10
See application file for complete search history.

(56) References Cited

FOREIGN PATENT DOCUMENTS

JP  09-129202 A  5/1997
KR  10-1287848 B1  7/2013

\* cited by examiner

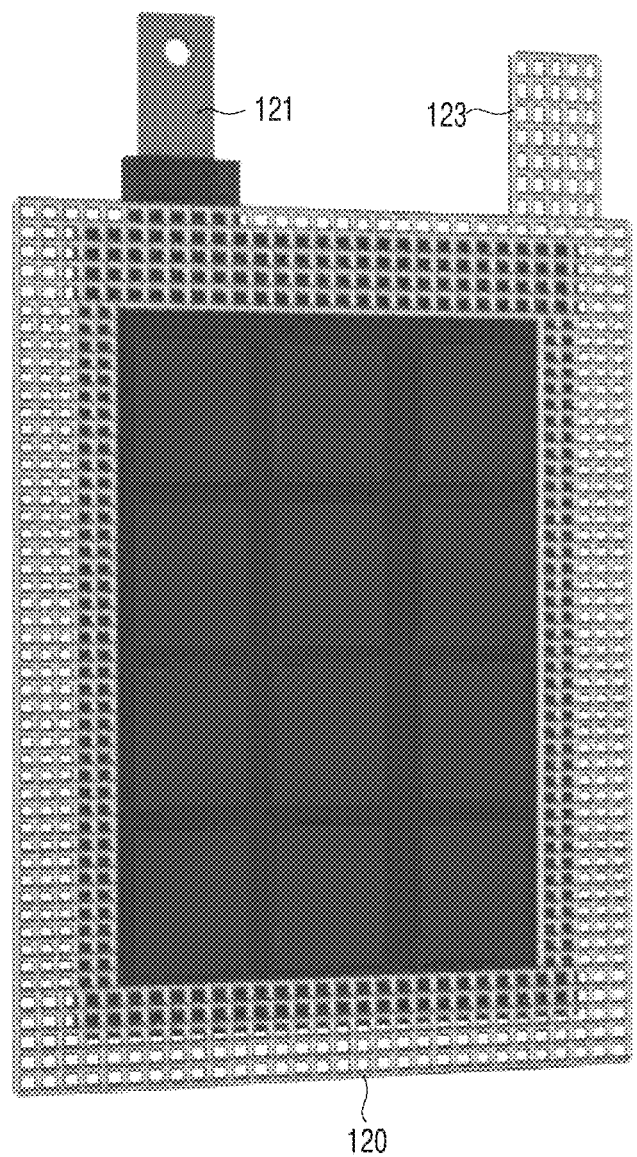
[Fig. 1]

[Fig. 2]
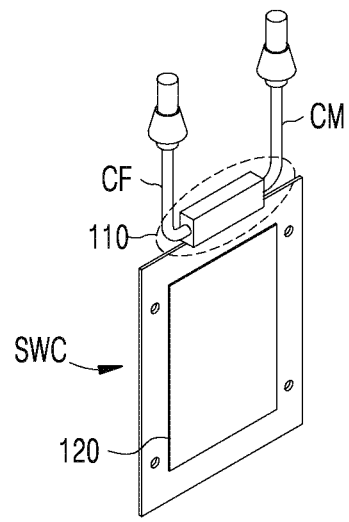
[Fig. 3]
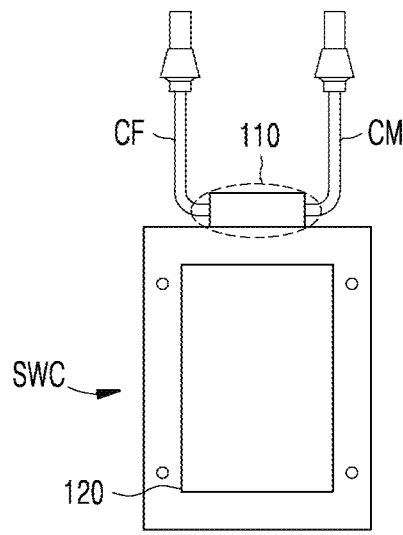

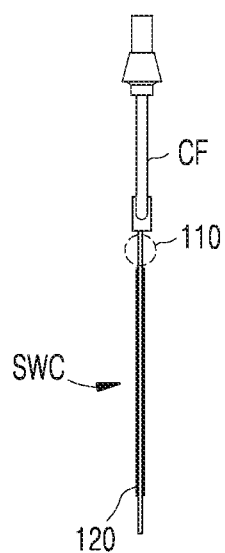
[Fig. 4]

Fig. 5
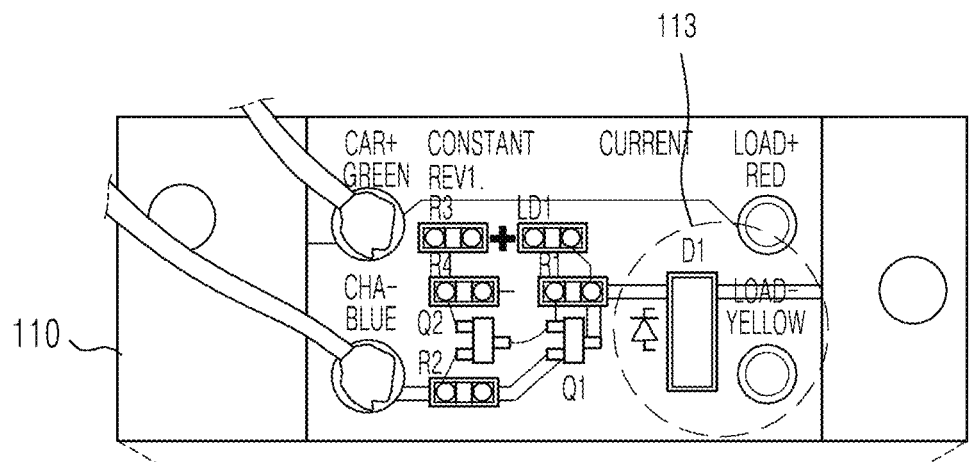
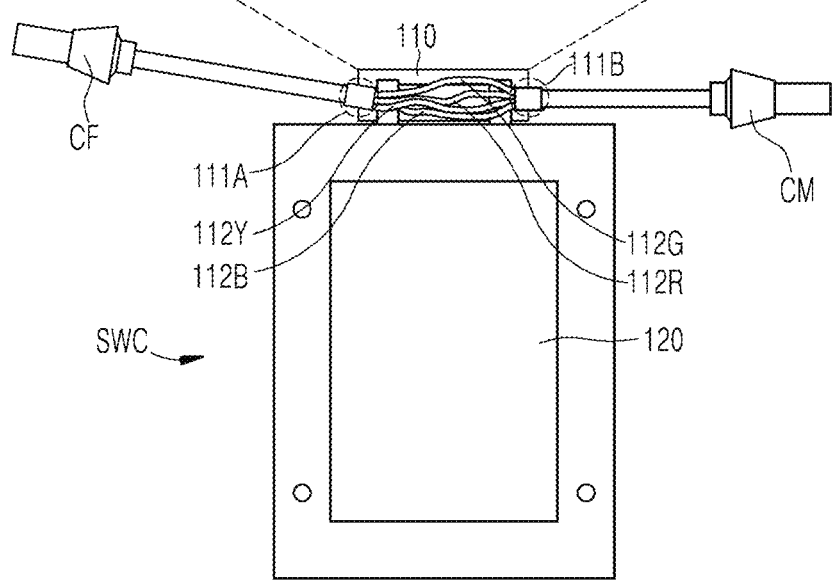
Fig. 6
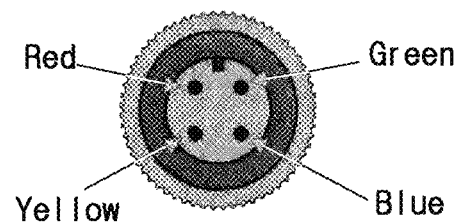

[Fig. 10]
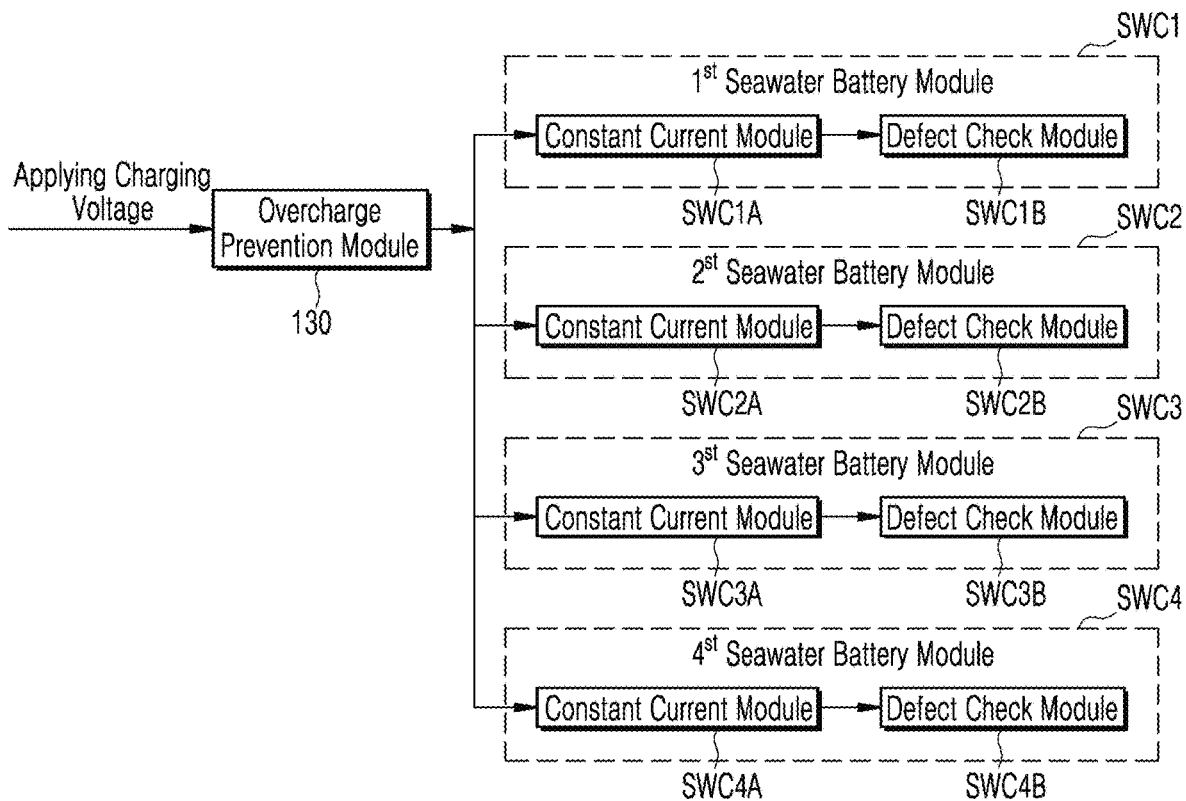
[Fig. 11]
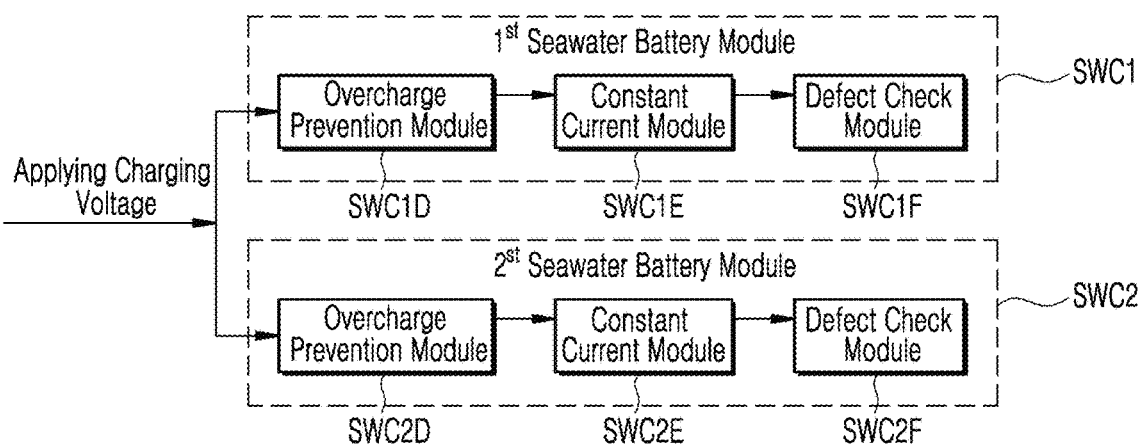

[Fig. 12]
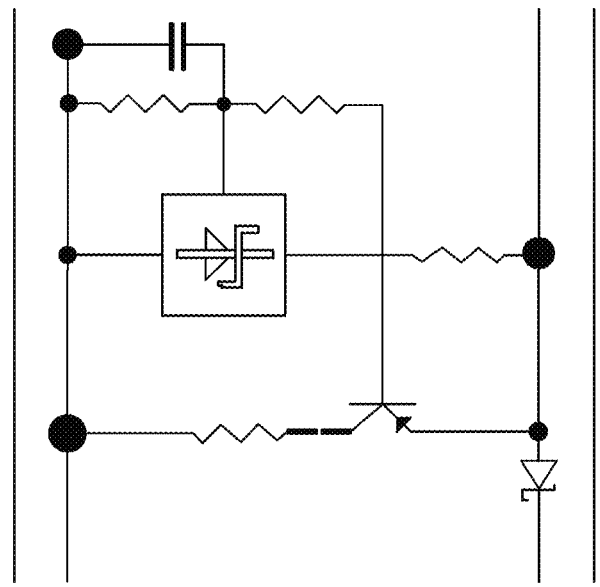
[Fig. 13]
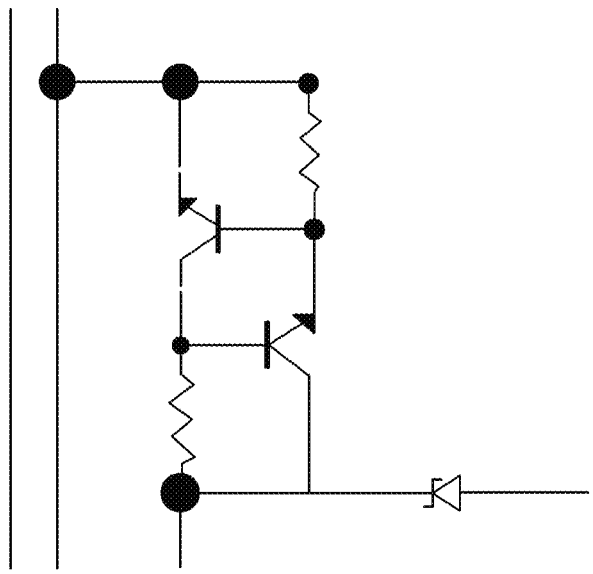

SEAWATER BATTERY CELL AND SEAWATER BATTERY INCLUDING SEAWATER BATTERY CELLS

BACKGROUND

1. Field

The present disclosure relates to a seawater battery, and more particularly, to a seawater battery cell utilizing infinite resources of sea and a seawater battery including a plurality of seawater battery cells.

2. Discussion of the Related Technology

Recently, as the use of portable electronic devices such as notebook computers and mobile phones has been rapidly increasing, a secondary battery technology for supplying power to these devices has attracted much attention. As the performance of these devices has improved, the power consumption has also increased, and the needs for high capacity and high voltage batteries are also emerging. Therefore, the performance of the secondary batteries has improved considerably due to the efforts of many engineers to overcome the disadvantages of the secondary batteries and to design high performance and high efficiency batteries, but the reality is that there are still many limitations.

Meanwhile, a seawater battery, which is one kind of battery, is eco-friendly, low-cost, and safe and stores and produces electric energy using virtually unlimited seawater. The seawater battery is capable of storing electric energy and of producing electric energy as needed using a chemical reaction between water and sodium ions dissolved in seawater.

The seawater battery has advantages in that the seawater battery is capable of providing twice the capacity of electricity or capable of supplying the same amount of electricity with half the size compared to widely used existing batteries such as lithium-ion batteries and lithium-polymer batteries, in that performance degradation is not caused by repeated charging and discharging, and in that there is no risk of explosion due to an external impact. The seawater battery does not require import-dependent lithium, which is significant in terms of technology independence.

Meanwhile, the aforementioned information is disclosed only as background information for helping in understanding the present disclosure. No decision and no opinion on whether any of the above content can be applied as the prior art of the present disclosure have been made yet.

SUMMARY

The present disclosure proposes a seawater battery cell or a seawater battery including a plurality of seawater battery cells, in which charging and discharging are normally performed even when the entire seawater battery is submerged in seawater.

The technical subjects pursued in the present disclosure may not be limited to the above-mentioned technical subjects, and other technical subjects which are not mentioned may be clearly understood, through the following descriptions, by those skilled in the art of the present disclosure.

A seawater battery cell according to an embodiment of the present disclosure may include: a seawater battery module having an anode and a cathode; a watertight structure coupled to the seawater battery module, the watertight structure being configured to tightly seal the anode and the cathode from seawater; a first watertight connector portion electrically connected to any one of the anode and the cathode; and a second watertight connector portion electrically connected to remaining one of the anode and the cathode and coupled to a first watertight connector portion of an adjacent seawater battery cell.

More specifically, the seawater battery cell may further include a constant current module disposed in the watertight structure and electrically connected to the anode and the cathode so as to allow a constant charging current to be supplied to the seawater battery module.

The seawater battery cell may further include a defect check module electrically connected to one end of the constant current module so as to recognize and display a charging defect of the seawater battery module.

More specifically, the watertight structure may fully enclose the anode and the cathode, and may include a first connection hole through which the first watertight connector portion passes and a second hole through which the second watertight connector portion passes.

Here, the watertight structure may be formed by molding an insulating material on the anode, the cathode, a portion of the first watertight connector portion, and a portion of the second watertight connector portion.

According to an embodiment, the seawater battery cell may further include an overvoltage prevention module electrically connected to a remaining end of the constant current module so as to prevent an overvoltage from being applied to the seawater battery module.

In addition, the first watertight connector portion and the second watertight connector portion may include a detachable configuration so as to be electrically connected to the adjacent seawater battery cell and a charging voltage application module.

Meanwhile, a seawater battery according to another embodiment of the present disclosure may include: a plurality of seawater battery cells; and a charging voltage application module electrically connected to the plurality of seawater battery cells so as to apply a charging voltage to the plurality of seawater battery cells. Each of the plurality of seawater battery cells includes: a watertight structure coupled to a seawater battery module having an anode and a cathode, the watertight structure being configured to tightly seal the anode and the cathode from seawater; a first watertight connector portion electrically connected to any one of the anode and the cathode; and a second watertight connector portion electrically connected to remaining one of the anode and the cathode and coupled to a first watertight connector portion of an adjacent seawater battery cell. The charging voltage application module may be electrically connected to a first watertight connector portion of a first seawater battery cell, which is not electrically connected, and a second watertight connector portion of a second seawater battery cell, which is not electrically connected.

More specifically, each of the plurality of seawater battery cells may further include a constant current module disposed in the watertight structure and electrically connected to the anode and the cathode so as to allow a constant charging current to be supplied to the seawater battery module.

Each of the plurality of seawater battery cells may further include a defect check module electrically connected to one end of the constant current module so as to recognize and display a charging defect of the seawater battery module.

In an embodiment, the seawater battery may further include an overvoltage prevention module disposed between the plurality of seawater battery cells and the charging voltage application module so as to prevent an overvoltage from being applied to the plurality of seawater battery cells when the plurality of seawater battery cells are connected to the charging voltage application module in parallel.

Each of the plurality of seawater battery cells may further include an overvoltage prevention module which prevents an overvoltage from being applied to the plurality of seawater battery cells when the plurality of seawater battery cells are connected to the charging voltage application module in serial.

It may be determined whether the plurality of seawater battery cells are connected to the charging module voltage application module in serial or in parallel based on pin mapping of the first watertight connector portion and the second watertight connector portion included in each of the plurality of seawater battery cells.

The first watertight connector portion and the second watertight connector portion, which are included in each of the plurality of seawater battery cells, may include a detachable configuration so as to be electrically connected to the adjacent seawater battery cell and a charging voltage application module.

According to various embodiments of the present disclosure, the following effects can be obtained.

i) Since the cathodes and anodes of seawater battery cells are completely watertight from seawater, even if the seawater battery cells and the entire seawater battery including the seawater battery cells are exposed to seawater, charging and discharging can be safely performed.

ii) Since it is possible to recognize an operation defect of each of the seawater battery cells constituting the seawater battery, only a seawater battery cell having an operation defect can be replaced.

iii) Since an overvoltage is not applied to the seawater battery, and it is possible to prevent an overvoltage from being applied to the seawater battery cell.

iv) Even if the seawater battery cells are connected to a charging voltage application module in series or in parallel, the operation can be normally performed.

v) Since seawater battery cells and a seawater battery having the seawater battery cells can be used even in the seabed, the seawater battery cells and the seawater battery can be applied to various machines driven in the seabed.

The effects which can be obtained by the present disclosure are not limited to those described above, and other effects, which are not described above, can be clearly understood by a person ordinarily skilled in the technical field, to which the present disclosure belongs.

BRIEF DESCRIPTION OF THE DRAWINGS

The above and other aspects, features and advantages of the present disclosure will be more apparent from the following detailed description taken in conjunction with the accompanying drawings, in which:

FIG. 1 is a view for explaining a seawater battery module used in a seawater battery cell according to an embodiment of the present disclosure;

FIGS. 2 to 5 illustrate a structure of a single seawater battery cell included in a seawater battery according to an embodiment of the present disclosure;

FIGS. 6 and 7 are views for explaining the pin structures of a first watertight connector unit and a second watertight connector unit included in a seawater battery cell according to an embodiment of the present disclosure;

FIG. 10 illustrates a structure and a signal flow when a charging voltage application module and a seawater battery module according to an embodiment of the present disclosure are connected in parallel;

FIG. 11 illustrates a structure and a signal flow when a charging voltage application module and a seawater battery module according to an embodiment of the present disclosure are connected in series;

FIG. 12 illustrates a circuit of an overvoltage prevention module according to an embodiment of the present disclosure; and FIG. 13 illustrates a circuit of a constant current module according to an embodiment of the present disclosure.

DETAILED DESCRIPTION OF EMBODIMENTS

Figure 7:
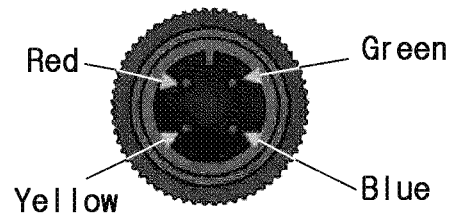

Hereinafter, various embodiments of the present disclosure will be described in detail with reference to the accompanying drawings. In the following description of the present disclosure, a detailed description of known functions or configurations incorporated herein will be omitted when it may make the subject matter of the present disclosure rather unclear.

FIG. 1 is a view for explaining the external appearance of a seawater battery module 120 according to an embodiment of the present disclosure. The seawater battery module 120 is a battery included in a seawater battery cell according to an embodiment of the present disclosure.

Referring to FIG. 1, the seawater battery module 120 is a module that stores and produces electrical energy through an electrochemical reaction between water and Na ions dissolved in seawater, and may include a cathode collector, seawater, a solid electrolyte, a negative pole material, an anode collector, and an organic electrolyte. Here, the cathode collector is a place where an electrolytic chemical reaction between a seawater cathode and electrons is capable of occurring, and may be formed of a carbon material that is coated with a catalyst, thereby reducing a difference between a charge voltage and a discharge voltage. The seawater (a positive pole material) is an energy source that infinitely supplies sodium ions. The solid electrolyte (e.g., NASICON) may be formed of a special ceramic material that only passes Na ions so as to act as a separation membrane and an electrolyte. The negative pole material stores sodium ions that have migrated from seawater so as to store electricity. The organic electrolyte is capable of allowing migration of sodium ions between the solid electrolyte and the anode material while preventing migration of electrons.

The seawater battery module 120 includes a negative electrode 121 (hereinafter, referred to as an "anode") and a positive electrode 123 (hereinafter, referred to as a "cathode"). The anode 121 and the cathode 123 may protrude outward. Thus, when the anode 121 and the cathode 123 are in direct contact with seawater, an electrical problem arises. Thus, in embodiments, a structure for sealing both the anode 121 and the cathode 123 from seawater is provided. The seawater battery cell SWC to be described later includes a structure that protects the anode 121 and the cathode 123 of the seawater battery module 120 from seawater.

Hereinafter, the structure of one seawater battery cell SWC included in the seawater battery 100 will be described with reference to FIGS. 2 to 5.

FIGS. 2 to 4 illustrate the appearance of a seawater battery cell (SWC) according to an embodiment of the present disclosure, and FIG. 5 illustrates the appearance of a circuit of the seawater battery cell SWC according to an embodiment of the present disclosure.

Referring to FIGS. 2 to 4, the seawater battery cell SWC includes a first watertight connector portion CF, a second watertight connector portion CM, a seawater battery module 120, and a watertight structure 110, and the watertight structure 110 is capable of electrically connecting the first watertight connector portion CF, the second watertight connector portion CM, and the seawater battery module 120.

First, the first watertight connector portion CF and the second watertight connector portion CM include a watertight configuration in which the connector portion itself prevents invasion of seawater. The first watertight connector portion CF and the second watertight connector portion CM may be detachably connected to adjacent watertight connector portions CF and CM, and may have a configuration capable of being connected to a charging voltage application module and various other devices.

In the first watertight connector portion CF and the second watertight connector portion CM, pins corresponding to the anode and the cathode and anode and cathode pins for charging may be included, and leads corresponding to the pins may also be included.

The first watertight connector portion CF and the second watertight connector portion CM may be connected to the anode or the cathode of the seawater battery module 120. For example, the first watertight connector portion CF may be connected to the anode of the seawater battery module 120, and the second watertight connector portion CM may be connected to the cathode of the seawater battery module 120. However, depending on an electric characteristic, the first watertight connector portion CF may be connected to the cathode of the seawater battery module 120, and the second watertight connector portion CM may be connected to the anode of the seawater battery module 120.

The first watertight connector portion CF and the second watertight connector portion CM may be electrically connected to the seawater battery module 120 through the conductors of the first watertight connector portion CF and the second watertight connector portion CM, rather than directly connected to the anode or the cathode of the seawater battery module 120.

The first watertight connector portion CF may be connected to the second watertight connector portion CM of an adjacent seawater battery cell or may be connected to a charging voltage application module or the like, and the second watertight connector portion CM may be connected to the first watertight connector portion CM of the adjacent seawater battery cell or may be connected to a charging voltage application module or the like.

The watertight structure 110 is formed to seal both the anode and cathode of the seawater battery module 120, which are exposed to the outside, in a watertight manner so as to prevent invasion of seawater. The watertight structure 110 may include a first connection hole through which the first watertight connector portion CF passes and a second connection hole through which the second watertight connector portion CM passes, and a plurality of holes through which leads included in the first watertight connector portion CF and the second watertight connector portion CM may also be formed in a substrate or an insulating material.

In addition, each seawater battery module 120 is capable of being charged at 3200 mW/hour, which may vary depending on how the seawater battery module 120 is implemented. A charging current may be set to 10 mA in the seawater battery module 120. In embodiments, the charging voltage is not exceed 3.7 V, but may vary depending on how the seawater battery module 120 is implemented.

Referring to FIG. 5, the first watertight connector portion CF and the second watertight connector portion CM include a configuration that can be detachably connected to adjacent watertight connector portions CF and CM, and may include leads of green 112G, red 112R, yellow 112Y, and blue 112B therein.

The anode (121 in FIG. 1) and the cathode (123 in FIG. 1) of the seawater battery module 120 can be sealed in a watertight manner by the watertight structure 110. Accordingly, the seawater battery module 120 can be submerged under seawater.

However, the watertightness structure 110 may include the connection holes through which leads pass, and the connection holes 111A and 111B through which the first watertight connector CF and the second watertight connector CM pass. In addition, the watertight structure 110 may include a structure that molds a portion of the first watertight connector portion CF and a portion of the second watertight connector portion CM with an insulating material.

Meanwhile, a constant current module may be disposed inside the watertight structure 110. The constant current module may be electrically connected to the anode and the cathode of the seawater battery module 120 so that a constant charging current can be supplied to the seawater battery module 120. The constant current module may be configured such that a current detection resistor is inserted in the emitter of a driving transistor and a constant current is supplied to the seawater battery module 120 using the base-emitter voltage of the transistor.

An LED (Light Emitting Diode) 113, which is a defect check module capable of displaying the presence or absence of a defect in the seawater battery cell SWC, may be disposed inside the watertight structure 110. The LED 113 is implemented so as not to be turned on at a voltage below a specific V when the end voltage of the seawater battery cell SWC is the specific V, so that the presence or absence of a defect in a specific seawater battery cell SWC can be checked. Here, the specific V may be 2 V, but may be set differently depending on how the LED 113 is implemented. That is, when the LED 113 of a specific seawater battery cell SWC is not turned on, it is recognized and displayed that charging is not normal.

According to an embodiment, the seawater battery cell 110 may further include an overvoltage prevention module electrically connected to the other end of the constant current module so as to prevent an overvoltage from being applied to the seawater battery module 120. When the seawater battery module 120 is connected in series with the charge voltage application module, the overvoltage prevention module may be applied to each seawater battery cell SWC.

Hereinafter, a plurality of pins included in a first watertight connector portion CF and a second watertight connector portion CM will be described with reference to FIGS. 6 and 7. FIG. 6 illustrates a plurality of pins of a first watertight connector portion CF included in a seawater battery cell SWC, and FIG. 7 illustrates a plurality of pins of a second watertight connector portion CM included in a seawater battery cell SWC.

The first watertight connector portion CF and the second watertight connector portion CM commonly have a first pin corresponding to a red lead, a second pin corresponding to a yellow lead, a third pin corresponding to a green lead, and a fourth pin corresponding a blue lead. Here, the colors of the lead may be variously implemented, but may be applied differently depending on a standard or a typically used method.

Referring to FIG. 6, the first pin of the first watertight connector portion CF is a cathode pin of the seawater battery cell, the second pin is an anode pin of the seawater battery cell, the third pin and the fourth pin may be mapped as a charging cathode pin and a charging anode pin, respectively. When a charging voltage application module such as a solar panel and the plurality of the seawater battery cells are connected in parallel, and when the charging voltage application module and the plurality of seawater battery cells are connected in series, the same pin mapping may also be performed.

Meanwhile, referring to FIG. 7, the pin mapping of the second watertight connector portion CM may be different from that of the first watertight connector portion CF depending on whether the charge voltage application module and the plurality of seawater battery cells are connected in parallel or in series.

First, when the charge voltage application module and the seawater battery cells are connected in parallel, the pin arrangement of the second watertight connector portion CM is the same as the pin arrangement of the first watertight connector portion CF. In this case, the first pin is the cathode pin of the seawater battery cell, the second pin is the anode pin of the seawater battery cell, and the third pin and the fourth pin may be mapped as the charging cathode pin and the charging anode pin, respectively.

However, when the charging voltage application module and the plurality of seawater battery cells are connected in series, the first pin is the cathode pin of the seawater battery cell and the second pin is the anode pin of the seawater battery cell as in the case where the charge voltage application module and the seawater battery cells are connected in parallel, but the third pin and the fourth pin may be mapped as the charging anode pin and the charging cathode pin, respectively. This may be a simple method of connecting the charging voltage application module and the plurality of seawater battery cells are connected in series merely with a difference in pin mapping without changing the circuit in the situation where the sodium ions in the seawater has a plus pole.

However, when the charging voltage application module and the plurality of seawater battery cells are connected in series, an overvoltage prevention module corresponding to the overcharge prevention module may be included in each of the plurality of seawater battery cells, which will be described later.

Figure 8:
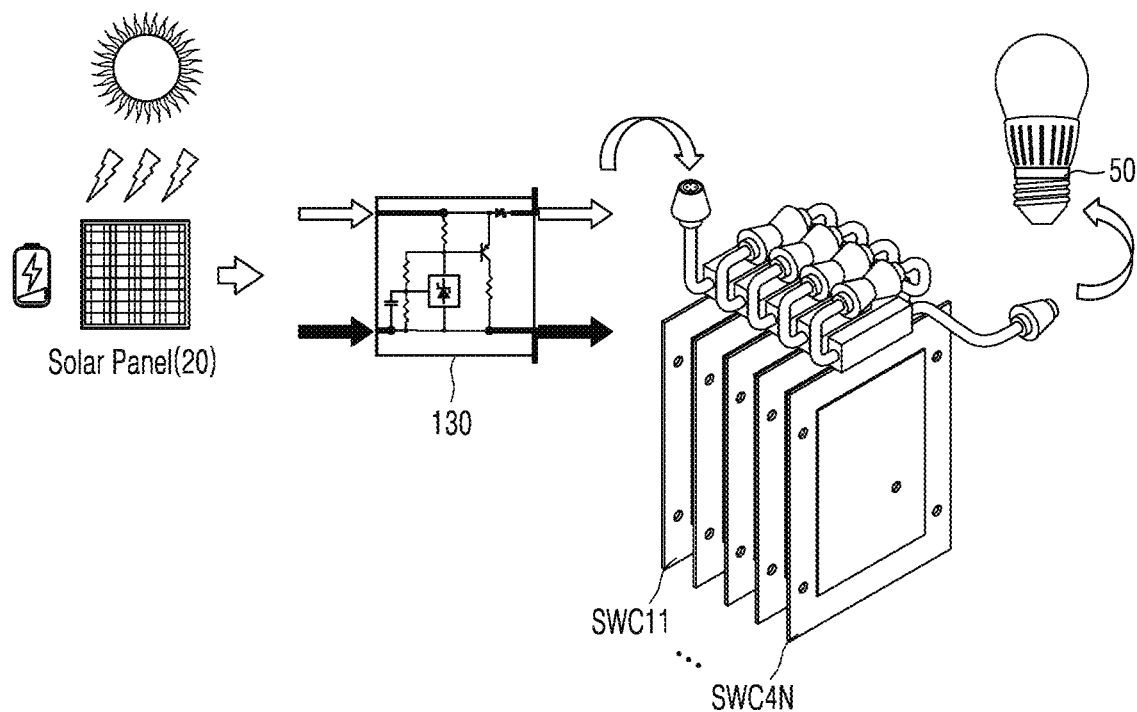
FIG. 8 and FIG. 9 are system diagrams illustrating a case where a charging voltage application module and a plurality of seawater battery cells according to an embodiment of the present disclosure are connected in parallel.

FIG. 8 is a system diagram illustrating a case where a solar panel 20 as a charging voltage application module according to an embodiment of the present disclosure and the seawater battery cells SWC11 to SW4N are connected in parallel.

First, energy can be generated in the solar panel 20 through sunlight and charging can be started. Only one overvoltage prevention circuit is implemented, and thus the charging voltage applied to the seawater battery cells SWC11 to SW4N may be limited to 3.7V. However, this may vary depending on how the overvoltage circuit is implemented.

The seawater battery cells SWC11 to SW4N can generate energy based on the supplied voltage and then supply the energy to various loads 50. The seawater battery cells SWC11 to SWC4N may be connected through the first watertight connector portions and the second watertight connector portions, may be electrically connected to the solar panel 20, and may be electrically connected to the various loads 50.

Figure 9:
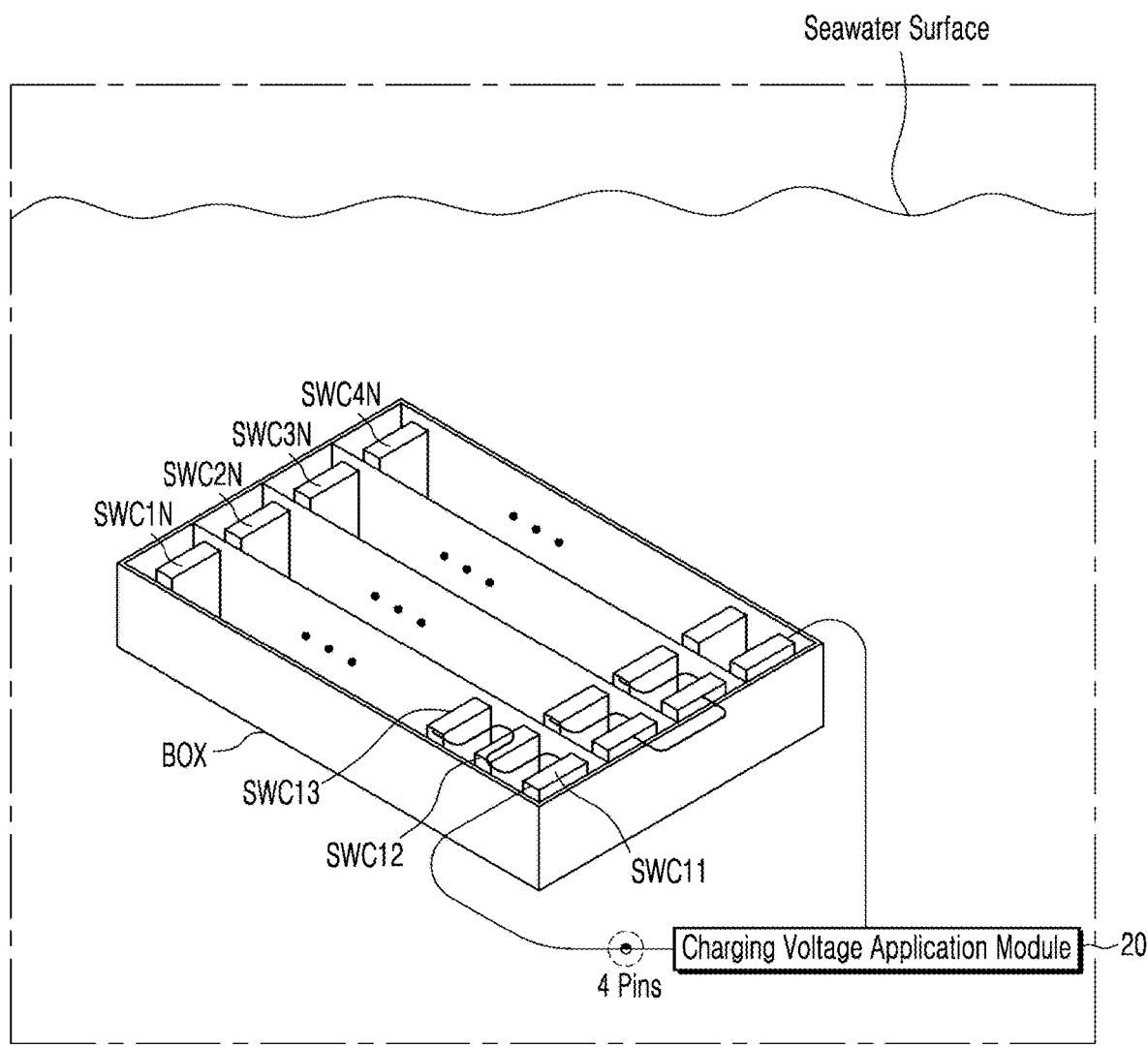

FIG. 9 illustrates a seawater battery 100 including a plurality of seawater battery cells SWC11 to SWC4N according to an embodiment of the present disclosure.

In an embodiment, the seawater battery 100 may be charged by being connected to a charging voltage application module 20 that supplies charging power. The connector to which the charging voltage application module 20 and the seawater battery 100 are connected may include four pins, and the four pins of the connector may include a charging anode pin, a charging cathode pin, a seawater battery anode pin, and a seawater battery cathode pin.

The seawater battery 100 may include a battery box (BOX) in which the plurality of seawater battery cells SWC11 to SWC4N are disposed, and the plurality of seawater battery cells may be arranged in four rows with 25 seawater battery cells per row. However, the size of the battery box (BOX) and the number of the seawater battery cells arranged in the battery box (BOX) may vary depending on how the battery box is implemented, and the seawater battery 100 may be implemented without the battery box 100.

Each of the plurality of seawater battery cells SWC11 to SWC4N included in the seawater battery 100 includes first and second watertight connector portions CF and CM that are not permeable to seawater, a seawater battery module that supplies power to a load, and a circuit that connects the seawater battery module and the first and second watertight connector portions CF and CM, and the circuit may be disposed inside watertight molding so as to prevent seawater penetration. Accordingly, even if the entire seawater battery 100 is submerged in seawater, there is no problem in charging and discharging.

The charging voltage application module 20 may be electrically connected to a first watertight connector portion of a specific seawater battery cell, which is not electrically connected, and a second watertight connector portion of a specific seawater battery cell, which is not electrically connected. However, this is only one embodiment, and the charging voltage application module 20 may be connected to the plurality of seawater battery cells in parallel or in series through a circuit.

The plurality of seawater battery cells SWC11 to SWC4N may be connected to the charging voltage application module 20 in parallel. If four seawater battery cells are described as an example, the seawater battery cells may be continuously connected to each other in such a manner that the first waterproof connector part CF of the first seawater battery cell is connected to the second watertight connector portion CM of the second seawater battery cell, the first watertight connector portion CF of the second seawater battery cell is connected to the second watertight connector portion CM of the third seawater battery cell, the first watertight connector portion CF of the third seawater battery cell is connected to the second watertight connector portion CM of the fourth seawater battery cell, and the second watertight connector portion CM of the first seawater battery cell and the first watertight connector portion CF of the fourth seawater battery cell is connected to the charging voltage application module 20. Alternatively, in another embodiment, as the charging voltage application module 20, a wind turbine capable of producing power may be applied instead of a solar panel, but the embodiment is not limited thereto.

When a charging voltage is applied by the charging voltage application module 20, energy is generated through the seawater battery module according to the principle of migration of Na ions contained in the seawater, and the generated energy can be supplied to various loads.

Particularly, the seawater battery 100 of FIG. 9 can be normally charged and discharged even in the state of being submerged under seawater, and thus it is said that the seawater battery 100 has a great improvement over the typical seawater battery, the electrode portions of which shall not be submerged under seawater.

FIG. 10 illustrates a configuration and a signal flow in the case where a charging voltage application module and a seawater battery module according to an embodiment of the present disclosure are connected in parallel, and FIG. 11 is a view for explaining a configuration and a signal flow in the case where a charging voltage application module and a seawater battery module according to an embodiment of the present disclosure are connected in series.

Referring to FIG. 10, a solar panel, a wind turbine, and the like correspond to a charging voltage application module, which is electrically connected to a plurality of seawater battery cells so as to apply a charging voltage to the plurality of seawater battery cells. When the charging voltage is applied from the solar panel or the like, the seawater battery 100 is able to prevent excessive charging from being performed through one overcharge prevention module 130. The overcharge prevention module 130 corresponding to the overvoltage prevention module is able to control such that the applied voltage does not exceed the voltage set in the seawater battery module SWC is not to applied. For example, the overcharge prevention module 130 is able to adjust the voltage so that the voltage of the seawater battery module SWC does not exceed 3.7V.

Each of the first to Nth seawater battery module SWC1 to SWCN may include a constant current module and a defect check module. The load may be included in each seawater battery module, or separately implemented outside each seawater battery module to consume the generated energy.

The first to Nth seawater battery modules SWC1 to SWCN include constant current modules, in which each constant current module is a module for charging a seawater battery module with a constant current, and the defect check module is able to detect a charging error of the seawater battery module.

Meanwhile, the defect check module may further include a communication module to transmit information on the defect check to the outside. For example, the defect check module is able to display a defect status with an LED or the like, and when a defect occurs, the defect check module is able to transmit a message indicating that a problem has occurred in a power generation system. The defect check module may further include a controller to provide in advance information on a seawater battery cell to be replaced to the outside on the basis of the use period of an LED or the like, a current voltage value, and the like.

In embodiments, referring to FIG. 11, when the charging voltage application module and the seawater battery module are connected in serial, since the charging voltage is not simultaneously applied, the overcharge prevention module is also provided inside each of the first seawater battery module and the second seawater battery module. Thus, overvoltage can be prevented from being applied to each of the seawater battery cells.

FIG. 12 illustrates a circuit of an overcharging prevention module according to an embodiment of the present disclosure. When the circuit is configured in parallel, only one of the charging voltage application module and the seawater battery module may be disposed, and when the circuit is configured in series, the circuit may be implemented in each seawater battery module. The overcharge prevention module is a circuit configured to allow a breakdown current to flow in a reverse direction through a Zener diode when a voltage excessing a specific voltage is applied thereto, thereby recognizing and preventing overcharge.

FIG. 13 illustrates a circuit of a constant current module according to an embodiment of the present disclosure. The constant current module may be configured such that a current detection resistor is inserted in the emitter of a driving transistor and a constant current is supplied to the seawater battery module using the base-emitter voltage (about 0.6 V) of the transistor.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. In addition, in the specification, the operations are illustrated in a specific sequence in the drawings, but it should be understood that the operations are not necessarily performed in the shown specific sequence.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A seawater battery cell comprising:
a seawater battery module including:
    a body,
    an anode including an exposed portion that outwardly protrudes from a first portion of the body such that the exposed portion of the anode is exposed out of the body, and
    a cathode including an exposed portion that outwardly protrudes from a second portion of the body different from the first portion such that the exposed portion of the cathode is exposed out of the body;
a watertight structure coupled to the seawater battery module, the watertight structure being configured to tightly seal the exposed portion of the anode and the exposed portion of the cathode from seawater;
a first watertight connector portion electrically connected to one of the exposed portion of the anode and the exposed portion of the cathode; and
a second watertight connector portion electrically connected to the other of the exposed portion of the anode and the exposed portion of the cathode and coupled to a first watertight connector portion of an adjacent seawater battery cell.

2. The seawater battery cell of claim 1, further comprising:
a constant current module disposed in the watertight structure and electrically connected to the anode and the cathode so as to allow a constant charging current to be supplied to the seawater battery module.

3. The seawater battery cell of claim 2, further comprising:
a defect check module electrically connected to one end of the constant current module so as to recognize and display a charging defect of the seawater battery module.

4. The seawater battery cell of claim 3, further comprising:
an overvoltage prevention module electrically connected to another end of the constant current module that is not connected to the defect check module so as to prevent an overvoltage from being applied to the seawater battery module.

5. The seawater battery cell of claim 1, wherein the watertight structure fully encloses the exposed portion of the anode and the exposed portion of the cathode, and includes a first connection hole through which the first watertight connector portion passes and a second hole through which the second watertight connector portion passes.

6. The seawater battery cell of claim 5, wherein the watertight structure is formed by molding an insulating material on the exposed portion of the anode, the exposed portion of the cathode, a portion of the first watertight connector portion, and a portion of the second watertight connector portion.

7. The seawater battery cell of claim 1, wherein the first watertight connector portion and the second watertight connector portion are detachably connected to the adjacent seawater battery cell and a charging voltage application module, respectively.

8. A seawater battery comprising:
a plurality of seawater battery cells; and
a charging voltage application module electrically connected to the plurality of seawater battery cells so as to apply a charging voltage to the plurality of seawater battery cells,
wherein each of the plurality of seawater battery cells includes:
a seawater battery module comprising;
a body,
an anode including an exposed portion that outwardly protrudes from a first portion of the body such that the exposed portion of the anode is exposed out of the body, and
a cathode including an exposed portion that outwardly protrudes from a second portion of the body different from the first portion such that the exposed portion of the cathode is exposed out of the body;
a watertight structure coupled to the seawater battery module, the watertight structure being configured to tightly seal the exposed portion of the anode and the exposed portion of the cathode from seawater;
a first watertight connector portion electrically connected to one of the exposed portion of the anode and the exposed portion of the cathode; and
a second watertight connector portion electrically connected to the other of the exposed portion of the anode and the exposed portion of the cathode and coupled to a first watertight connector portion of an adjacent seawater battery cell, and
wherein the charging voltage application module is electrically connected to a first watertight connector portion of a first seawater battery cell among the plurality of seawater battery cells, and a second watertight connector portion of a second seawater battery cell among the plurality of seawater battery cells.

9. The seawater battery of claim 8, wherein each of the plurality of seawater battery cells further includes:
a constant current module disposed in the watertight structure and electrically connected to the anode and the cathode so as to allow a constant charging current to be supplied to the seawater battery module.

10. The seawater battery of claim 9, wherein each of the plurality of seawater battery cells further includes:
a defect check module electrically connected to one end of the constant current module so as to recognize and display a charging defect of the seawater battery module.

11. The seawater battery of claim 10, further comprising:
an overvoltage prevention module disposed between the plurality of seawater battery cells and the charging voltage application module so as to prevent an overvoltage from being applied to the plurality of seawater battery cells when the plurality of seawater battery cells are connected to the charging voltage application module in parallel.

12. The seawater battery of claim 10, wherein each of the plurality of seawater battery cells further includes:
an overvoltage prevention module is configured to prevent an overvoltage from being applied to the plurality of seawater battery cells when the plurality of seawater battery cells are connected to the charging voltage application module in serial.

13. The seawater battery of claim 10, wherein it is determined whether the plurality of seawater battery cells are connected to the charging voltage application module in serial or in parallel based on pin mapping of the first watertight connector portion and the second watertight connector portion included in each of the plurality of seawater battery cells.

14. The seawater battery of claim 8, wherein the first watertight connector portion and the second watertight connector portion, which are included in each of the plurality of seawater battery cells, are detachably connected to the adjacent seawater battery cell and a charging voltage application module, respectively.

* * * * *